United States Patent [19]

Ohta

[11] 4,361,903
[45] Nov. 30, 1982

[54] DATA TRANSMISSION PROCESS IN A CATV SYSTEM

[75] Inventor: Yoshitsugu Ohta, Tokyo, Japan

[73] Assignee: Pioneer Electronic Corporation, Tokyo, Japan

[21] Appl. No.: 173,597

[22] Filed: Jul. 30, 1980

[30] Foreign Application Priority Data

Aug. 16, 1979 [JP] Japan ................... 54-104450

[51] Int. Cl.³ ............................................. H04N 7/18
[52] U.S. Cl. ............................................ 455/2; 455/5;
340/825.54; 358/84
[58] Field of Search ................. 455/2, 3, 4, 5, 6, 34,
455/67; 358/86, 84, 139; 340/291, 505, 533,
534, 152 R

[56] References Cited

U.S. PATENT DOCUMENTS

| | | | |
|---|---|---|---|
| 3,668,307 | 6/1972 | Face | 455/5 |
| 3,733,430 | 5/1973 | Thompson | 455/2 |
| 4,025,851 | 5/1977 | Haselwood | 358/84 |
| 4,090,220 | 5/1978 | Gargini | 455/5 |
| 4,290,142 | 9/1981 | Schnee et al. | 455/3 |

FOREIGN PATENT DOCUMENTS

2725250 7/1978 Fed. Rep. of Germany ......... 455/5

OTHER PUBLICATIONS

The Total Communication Concept For The Future, By Gargini, The Royal Television Society Journal, Mar./Apr. 1973, pp. 182-193.

Primary Examiner—Tommy P. Chin
Attorney, Agent, or Firm—Fraser and Bogucki

[57] ABSTRACT

In a bidirectional CATV system, terminal devices at individual subscriber locations are arranged in sets, with each terminal device in a set being coupled to an intermediate polling processor which includes means for storing status data as to each of the terminal devices. The head end system polls the intermediate processors for their consolidated reports, with the result that tens of thousands of subscriber locations can be serviced without inordinate delays by a single head end system.

2 Claims, 2 Drawing Figures

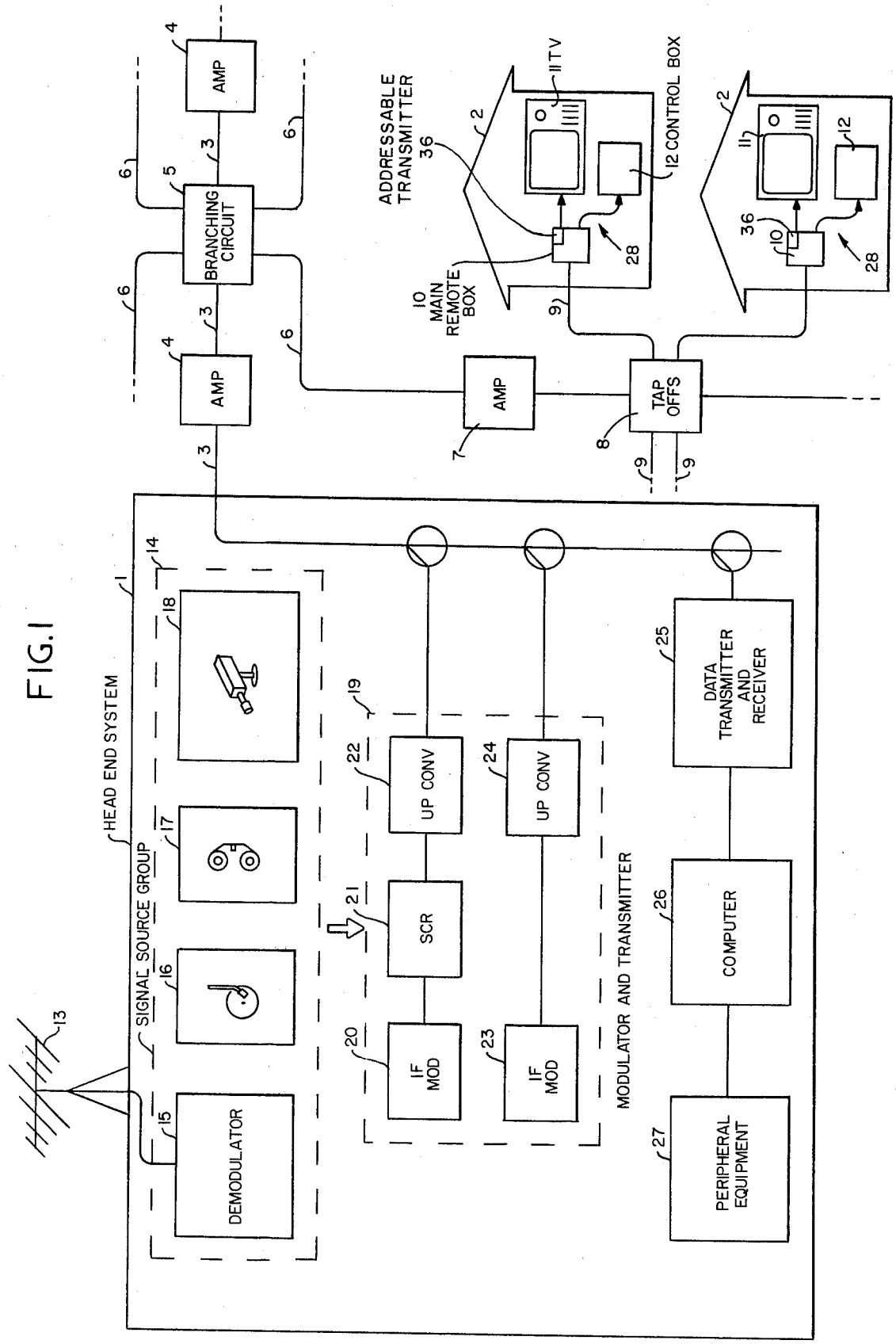

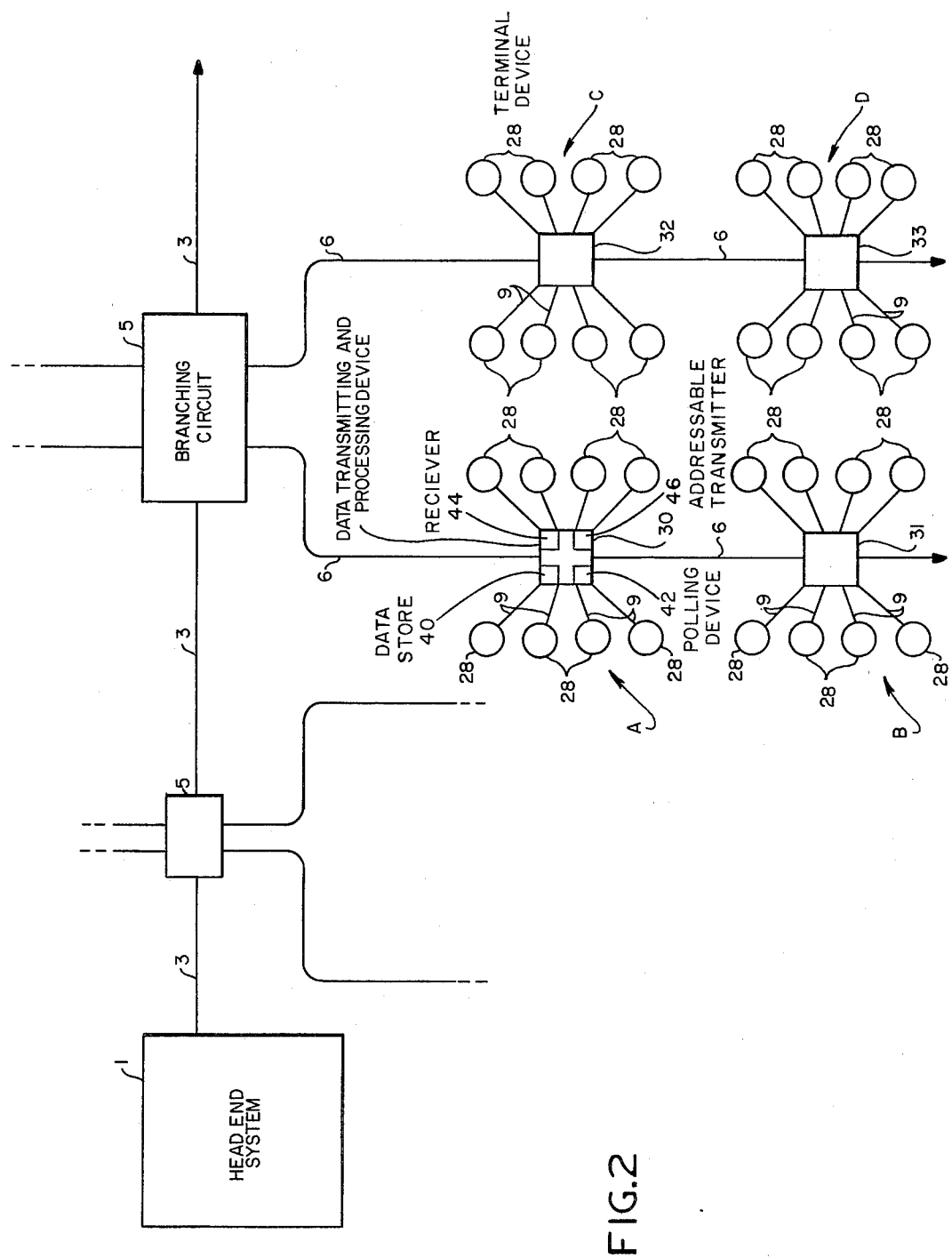

DATA TRANSMISSION PROCESS IN A CATV SYSTEM

BACKGROUND OF THE INVENTION

The present invention relates to a CATV system, and to a data transmission process in a CATV system for transmitting data from terminal equipment to a head end system at a rapid rate.

Many CATV systems are characterized by two-way data communication through cables between the head end system and terminal equipment so that the head end can obtain data from a number of terminal devices and provide for communication with the remote terminals. The two-way communication is normally carried out by polling or interrogation to identify a terminal device. With an increased number of terminal devices, however, each terminal device should still be polled and data should be received in response to such polling. This requires a long total period to poll all of the terminal devices individually, and results in a variety of difficulties. For example, security service requires that data identifying the occurrence of a fire, burglary, gas leakage or the like in a home equipped with a terminal device be transmitted without delay in order to minimize danger and damage. Accordingly, it is undesirable to be required to have a long polling period under these circumstances.

SUMMARY OF THE INVENTION

With the foregoing problem in view, the present invention provides a data transmission process in a CATV system wherein a plurality of addressable terminal devices having addresses are grouped into sets, and the terminal devices in each set are connected to an addressable data transmitting and processing device having an address by a conductor, so that the terminal devices associated with each data transmitting and processing device are addressably interrogated thereby and data from each terminal device is stored in the data transmitting and processing device, and can be transmitted to a head end at a rapid rate by addressably interrogating or polling the data transmitting and processing devices.

BRIEF DESCRIPTION OF THE DRAWINGS

A better understanding of the invention may be had by reference to the following description, taken in conjunction with the accompanying drawings, in which:

FIG. 1 is a schematic diagram illustrative of a CATV system; and

FIG. 2 is a block diagram showing an embodiment of the present invention.

DETAILED DESCRIPTION OF THE INVENTION

Generally, a CATV system is characterized in that a center or head end system is wired with a number of terminal devices equipped in individual homes for transmitting a radio wave picked up by the head end or a program produced by the head end to a television receiver at each individual home. This system allows the head end to be connected to each home by a conductive cable for mutual exchange of information by way of two-way-communication between the head end and each home, so that a variety of applications are possible as well as transmission of TV programs to individual television receivers.

Such CATV system will be described with reference to FIG. 1. The system comprises a single center or head end 1 and an addressable 28 located in each of several tens of thousands of homes 2, the head end 1 being connected by coaxial cables to the terminal devices 28 in the homes 2. A main cable 3 extends from the head end 1 and has in predetermined positions main cable amplifiers 4 and branching circuits 5, from each of which there extend a plurality of branch cables 6 each having a predetermined positions booster amplifiers 7 and tap-offs 8. A plurality of branch cables 9 extend from each tap-off 8 and each are led into individual ones of the homes 2. The terminal device 28 in the home 2 comprises a main remote box 10, a television receiver 11, and a control box 12. The distal end of each branch cable 9 is connected to the main remote box 10, to which the television receiver 11 and the control box 12 are connected. Stated otherwise, the head end is branched and connected to the terminal devices 28 in the individual homes in a network which assumes the shape of a "christmas tree" as a whole.

The head end 1 has an outdoor antenna 13 connected to a demodulator 15 in a group 14 of signal sources, such as a video disk player 16, a video tape recorder 17, and a studio 18. A modulator and transmitter 19 which receives signals from the signal source group 14 consists of two systems, one including an IF modulator circuit 20, a scramble circuit 21, and an up-converter circuit 22, and the other including an IF modulator 23 and an up-converter circuit 24. The outputs of the up-converters 22, 24 are connected to the main cable 3. The main cable 3 is connected to a data transmitter and receiver 25 for data transmission with each main remote box 10, the data transmitter and receiver 25 being connected to a computer 26 which is connected to peripheral equipment 27 such as a printer and a display unit.

Operation of the CATV head end system is as follows: The television receiver 11 is switched on with a certain unused channel being selected, and the remote control box 12 is actuated such that the channel to be utilized by the main remote box 10 is frequency-converted into the unused channel. Channels selectable by the remote control box 12 are grouped, for example, into (A) re-transmission channels in which television radio waves are received as they are, (B) channels for sustaining programs (free of charge), and (C) channels for free-charging programs. Each group has 10 channels and the viewer has a total of 30 channels to choose from.

(A) Re-transmission

The television radio wave picked up by the antenna 13 is first demodulated by the demodulator 15, which produces an output to the modulator and transmitter 19, wherein it is modulated by the IF modulator 23. A modulated signal is then processed by the up-converter 24 so as to have a predetermined higher frequency according to a new frequency arrangement for rearranging channels. The signal which is thus modulated for assignment to a predetermined channel is fed through the main cable 3, the branch cable 6, and the branch cable 9 to the television receiver 11 for reproduction.

(B) Sustaining program

This is represented by a weather forecast, a news program and the like. A recorded program reproduced by the video disk player 16 or the video tape recorder 17 or a live program produced in the studio 18, is modulated by the IF modulator 23 and the up-converter 24, and its frequency is multiplied up to a predetermined channel frequency before being fed through the main cable 3. The program is free of charge regardless of frequency and time interval of reception and each home can receive such programs by paying a basic rate each month.

(C) Chargeable program

This includes a newly arrived movie or a certain other program. A recorded program reproduced by the video disk player 16 or the video tape recorder 17, or a live program produced in the studio 18, is modulated by the IF modulator 20, and is processed by the scrambler 21 into a signal that cannot be properly reproduced if received as it is. Then, its frequency is multiplied by the up-converter 22 up to the frequency for a predetermined channel before it is fed through the main cable 3. When this chargeable program is to be received at each home 2, the fed signal is descrambled by the main remote box 10 into a normal video signal, which is then fed to the television receiver 11 for normal reproduction. Reception of chargeable programs leads to calculation of a predetermined rate, and the subscriber will be billed monthly for a special subscription rate (measured rate) in addition to a monthly basic rate.

While the head 1 and each home 2 are interconnected by the coaxial cable, it is necessary to ascertain which home 2 is receiving which channel during a certain time to tell whether a program being received is chargeable or not, so that the CATV system will be commercially feasible. To this end, the data transmitter and receiver 25 sends out an interrogation signal at a given interval of time to poll each terminal device 28 with its own address number, thereby ascertaining which channel is being received on such inspection. An addressable data transmitter 36 within the terminal device 28 then gives an answer as to which channel is being received, to the data transmitter and receiver 25. Transmitted and received data in the data transmitter and receiver 25 is sorted and stored by the computer 26, and is displayed or printed by the peripheral equipment 27. Such polling is carried out at a given interval of time (every several minutes or several tends of minutes), so that popularity ratings and the like for programs are available immediately.

In such a program which involves participation of viewers, the viewers actuate the remote control boxes 12 to respond to the program while looking at the receivers 11, the responses being fed to the head end 1 through the coaxial cables.

FIG. 2 shows an embodiment of the present invention, in which branch cables 6 from branching circuits 5 have data transmitting and processing devices 30–33 at predetermined intervals. The data transmitting and processing devices 30–33 are connected to a plurality of terminal devices 28 separated into groups A, B, C and D. Each of the data transmitting and processing devices 30–33 has its own address and is capable of polling or calling the addresses of the terminal devices 28 in one of the groups A–D to which it is connected. The data transmitting and processing devices 30–33 each have data store 40 providing a capability of storing data from the terminal devices 28 and function to serve as branch devices.

Operation of this embodiment is as follows: A downstream signal from the head end 1 is fed through the main cable 3, the branching circuits 5, the data transmitting and processing devices 30–33, and the branch cables 9 to each terminal device 28 for reception of a television program. Each data transmitting and processing devices 30–33 has a polling device 42 which always polls the terminal devices 28 to which it is connected, and a receiver 44 which receives data from the terminal devices 28 and processes such data and stores the results. Independently of the polling by the data transmitting and processing devices 30–33 of the terminal devices 28, the head end 1 polls the addresses of the data transmitting and processing devices 30–33. Assuming that a data transmission and processing device 30 is polled, it sends out, through an addressable transmitter 46, data stored therein in response to its polling, as an immediate upstream signal to the head end 1. Thus, all data in the terminal devices 28 in the group A is transmitted to the head end 1 by a single polling. By successively polling the other data transmitting and processing devices 31–33, data in the terminal devices 28 in the groups B, C, D are transmitted to the head end 1. Thus, in addition to the polling by the head end 1 of the data transmitting and processing devices 30–33, the latter also poll the terminal devices 28, with the result that the period of polling can be reduced as compared with the polling by the head end 1 of all of the terminal devices 28.

With the present invention thus arranged, the total polling period is shortened to allow much faster transmission of data from all terminal devices. The present invention is therefore applicable to a CATV system having a multiplicity of terminal devices.

What is claimed is:

1. The method of interrogating terminal devices by a head end in a cable television system comprising the steps of:

addressably interrogating a set of addressable terminal devices at each of a plurality of addressable data transmitting and processing devices, each addressable terminal device being coupled to an associated data transmitting and processing device by a conductor, receiving a plurality of selectable television signals over the conductor, receiving interrogation signals over the conductor, and transmitting terminal information over the conductor in response to an interrogation signal containing an address of said addressable terminal device, receiving and storing at each addressable data transmitting and processing device, terminal data transmitted by each addressable terminal device coupled thereto over the conductor device in response to an interrogation;

addressably interrogating each addressable data transmitting and processing device at a head end, each addressable data transmitting and processing device being coupled to the head end by a conductor and transmitting over the conductor in response to a single addressable interrogation containing a respective address thereof stored terminal data for each addressable terminal device associated therewith.

2. A bidirectional CATV system comprising:

a head end system transmitting polling signals, each polling signal indicating a data transmitting and processing device address, and also transmitting different program materials on various channels;

a plurality of terminal devices, each associated with a different subscriber, and each including addressable means for providing data as to the status of the terminal device including an indication of whether at least certain channels are being used by the associated subscriber;

a number of transmitting and processing devices, each including means for polling a different associated set of terminal devices, means for storing data received from the polled terminal devices, and addressable means including transmitting means for providing consolidated status reports from the stored data as to the set of associated terminal devices in response to a polling signal indicating an address of the transmitting and processing device; and bidirectional cable network means coupling the head end system to the transmitting and processing devices, and each transmitting and processing device to the set of terminal devices associated therewith.

* * * * *

UNITED STATES PATENT AND TRADEMARK OFFICE
CERTIFICATE OF CORRECTION

PATENT NO. : 4,361,903
DATED : November 30, 1982
INVENTOR(S) : Yoshitsugu Ohta

It is certified that error appears in the above-identified patent and that said Letters Patent are hereby corrected as shown below:

Column 2, line 5, after "addressable" and before "28", insert --terminal device--; line 49, after "for" and before "programs", "free-charging" should read --fee-charging--. Column 3, line 26, after "head" and before "1", insert --end--. Column 4, line 3, before "30-33", "devices" should read --device--; line 11, after "data" and before "and", "transmission" should read --transmitting--; line 49, after "conductor" and before "in", strike "device".

Signed and Sealed this

Twenty-second Day of March 1983

[SEAL]

Attest:

Attesting Officer

GERALD J. MOSSINGHOFF

Commissioner of Patents and Trademarks